United States Patent
Lonczak et al.

(10) Patent No.: US 8,056,722 B2
(45) Date of Patent: Nov. 15, 2011

(54) BAKING PAN STACKING CLIPS

(76) Inventors: John Lonczak, Newburgh, NY (US); Brian R. Rodriguez, Newburgh, NY (US); Stephen V. Papageorge, Larchmont, NY (US)

( * ) Notice: Subject to any disclaimer, the term of this patent is extended or adjusted under 35 U.S.C. 154(b) by 1154 days.

(21) Appl. No.: 11/164,149

(22) Filed: Nov. 11, 2005

(65) Prior Publication Data

US 2007/0108080 A1     May 17, 2007

(51) Int. Cl.
*B65D 21/00*     (2006.01)
*B65D 85/62*     (2006.01)
*A47F 3/14*     (2006.01)

(52) U.S. Cl. ............ 206/509; 206/503; 211/126.12

(58) Field of Classification Search .......... 206/506, 206/585, 499; 211/126.11, 126.12, 126.14, 211/126.15; 220/23.4, 23.6
See application file for complete search history.

(56) References Cited

U.S. PATENT DOCUMENTS

| | | | | |
|---|---|---|---|---|
| 1,396,148 A | * | 11/1921 | Snyder | 206/503 |
| 4,241,831 A | * | 12/1980 | Locatelli | 206/506 |
| 4,452,581 A | * | 6/1984 | Panehal | 425/464 |
| 4,534,475 A | * | 8/1985 | Mayo | 211/126.12 |
| 4,848,608 A | | 7/1989 | Anderson | |
| 5,054,629 A | * | 10/1991 | Breen | 211/126.12 |
| 5,178,276 A | * | 1/1993 | Sheets | 206/427 |
| 5,263,595 A | | 11/1993 | Hilstolsky | |
| 5,651,597 A | | 7/1997 | Oslin | |
| 5,971,456 A | | 10/1999 | Capelleveen | |

* cited by examiner

*Primary Examiner* — Mickey Yu
*Assistant Examiner* — Shawn Braden
(74) *Attorney, Agent, or Firm* — Malin Halye Dimaggio Bowen & Lhota, P.A.

(57) ABSTRACT

A unitary, single-piece baking pan support clip for stacking one or more baking pans vertically to save space without contacting or damaging the contents of each stacked pan. Each clip is comprised of a thin, planar rigid bar having a vertical shaft, horizontal and vertical upper arms that contact and support the bottom surface and exterior sidewall of a baking pan and a base having a recess that secures the clips to the interior sidewall and lip bead of the lower pan. The base recess that is shaped as a cylindrical channel to securely snap or fit over the lip bead of the baking pan to which the clip is attached.

8 Claims, 6 Drawing Sheets

BAKING PAN STACKING CLIPS

FIELD OF THE INVENTION

This invention relates to a baking pan support apparatus for use in home and commercial kitchens that allows two or more baking pans to be firmly stacked one on top of another so as to conserve space without crushing or otherwise negatively impacting or contacting the contents of each pan.

DESCRIPTION OF RELATED ART

In both residential and commercial kitchens, baking pans and trays occupy large amounts of countertop and stove surface areas, particularly when multiple pans or trays are being used at the same time. Various types of stacking devices, including holding racks, have been designed for use in ovens, refrigerators, freezers, storage areas, and for countertops. However, many of these devices are large and bulky and most, if not all, include numerous moving parts, which increase the likelihood of malfunction as well as the costs and difficulty of both production by the manufacturer and assembly and operation by the user.

U.S. Pat. No. 4,848,608, issued to Anderson on Jul. 18, 1989, describes an expandable racking system for trays comprising an upright member, a tray slide member, and an interlocking member for attaching a tray slide member to an upright member.

U.S. Pat. No. 5,971,456, issued to van Capelleveen on Oct. 26, 1999, describes a bakery system with gripper assemblies for stacking and unstacking baking pans. The device includes a pick-up bar and one or more holding assemblies carried on the bar. The invention describes the gripper assembly as having numerous holding assemblies each having a finger element pivotally connected to the pick-up bar, with said finger elements being mechanically linked so that movement of one finger element causes movement of the other finger element.

U.S. Pat. No. 5,263,595, issued to Hilstolsky on Nov. 23, 1993, describes a modular rack system for use with removable pans. The '595 invention comprises a horizontal polygonal base frame assembly, an identical horizontal top frame assembly, and two vertical support assemblies. The components of the '595 invention are manufactured from formed wire.

U.S. Pat. No. 5,651,597, issued to Oslin on Jul. 29, 1997, describes an adjustable rack for supporting trays or pans. The '597 invention comprises a plurality of rack members secured in parallel spaced relation to transverse support rods that can be releasably mounted to the sidewall of an oven chamber.

SUMMARY OF THE INVENTION

A unitary, single-piece baking pan support clip for firmly stacking a plurality of baking pans containing baked goods without contacting or damaging the contents of each pan. Three or more clips are snapped at one end vertically to a lower baking pan to support an upper pan. Each pan support clip is a unitary bar of rigid heat resistant material such as aluminum and has a predetermined configuration to firmly support and balance an upper flat bottom pan. Each clip body comprises a vertical shaft, a base having a concave recess for snapping on a pan bead and an upper horizontal support arm. Three or more clips are snapped onto a lower baking pan perimeter top lip cylindrically shaped bead surrounding the upper edge of the sidewall of a baking pan for supporting one or more similar baking pans vertically.

The clip body vertical shaft comprises a planar bar of rigid material unitarily connected to the clip base at one end and the horizontal arm at the other end. The vertical shaft is oriented at substantially the same angle as the base outer member. The base recess has an inner member and an outer member that form the snap on recess. The horizontal arm is connected to the vertical shaft and a small vertical upper arm that aids balance and pan bottom support.

The horizontal arm comprises a planar bar of material having a flat support area solidly and integrally attached to the vertical shaft. The base recess engages the lip bead of the lower baking pan. The base recess is formed by an outer leg member that is curved slightly toward an inner leg member so as to provide a more secure concave recessed geometric fit with the cylindrical shape of the lip bead of the lower baking pan.

The horizontal and vertical pan support arms at the top of the vertical shaft form an angle slightly larger than 90 degrees. The vertical arm is much shorter than the horizontal arm. The flat bottom baking pan corner fits snuggly in the curved area joining the horizontal arm and the vertical arm. The bar recess is shaped as a cylindrical channel running between two adjoining inner and outer legs and is complementary in shape to the cylindrical lip bead of the baking pan. The base recess of the clip is slipped and snapped over the lip bead of the lower baking pan, and the resting weight of the upper baking pan stacked upon the horizontal arm of each clip pushes said base recess firmly down on the lip bead of the baking pan for all clips. Three clips may be used but four to six clips per baking pan is preferable for supporting each upper baking pan.

The horizontal arm is flat on its upper side and comprises a planar bar of material integrally attached to the top end of the vertical shaft. The flat side of the horizontal arm contacts an exterior flat bottom surface of the supported upper banking pan to support said upper pan in a stacked position. The vertical arm member comprises a planar bar of material solidly attached to the vertical shaft and joining the horizontal arm at an angle greater than 90 degrees. The vertical arm contacts an exterior sidewall of a supported upper pan so that said upper pan does not slip sideways and fall from the clip support. When under the weight of the stacked upper baking pan, the horizontal pan support arm acts as a counterweight that pivots the base recess of the clips to lock said clip onto the side of the lower baking pan.

The pan support clip may be constructed from any sturdy, rigid material, including, but not limited to, metals, metal alloys, plastics, elastomer-coated metal or metallic alloys, and other polymers. Said clip should be constructed from a heat-resistant and cold-resistant material. The support clips may be manufactured in any size needed, but preferably, are manufactured to fit a standard baking pan and to create a standard distance between stacked baking pans.

To support an upper pan or tray that is to be stacked upon a lower pan or tray, three or more of said support clips must be attached to the lower pan or tray to accommodate and adequately support the upper pan or tray. The support clips permit multiple baking pans to be stacked one on top of another to conserve space. This spacer-saving function is particularly useful in kitchens, including within ovens, refrigerators, freezers, and storage areas as well as on countertops and tabletops.

An object of this invention is to provide an inexpensive rigid clip that is easily connected to a lip bead of a first container to support a second container stacked upon said first container.

Another object of this invention is to provide a clip that permits the stacking and unstacking of containers, including baking pans, trays, and shelves, to conserve space in a kitchen, greenhouse, or in any other area in which containers capable of being stacked are used.

Still another object of this invention is to provide a clip that permits the stacking and unstacking of containers, including baking pans, trays, and shelves, one on top of another without contacting or damaging the contents of each lower or inferior container.

In accordance with these and other objects which will become apparent hereinafter, the instant invention will now be described with particular reference to the accompanying drawings.

DETAILED DESCRIPTION

Figure 1:
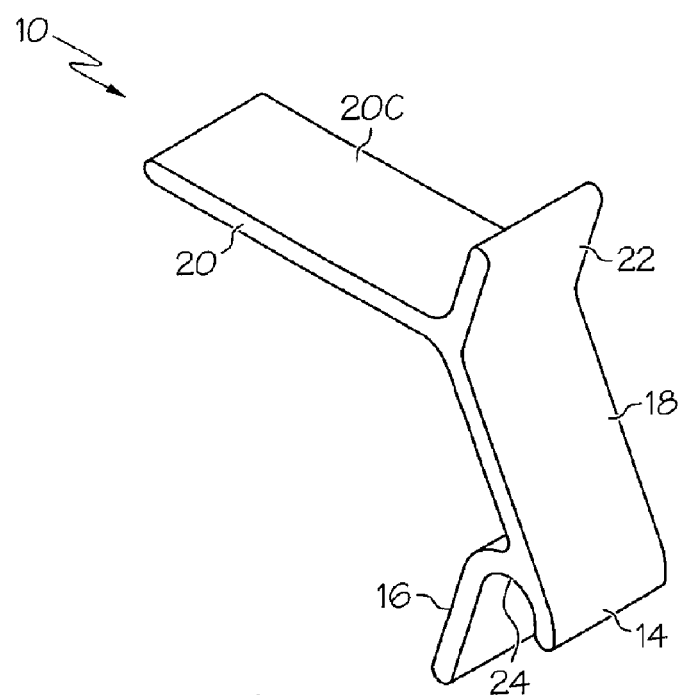
FIG. 1 shows a perspective view of the invention.
Figure 2:
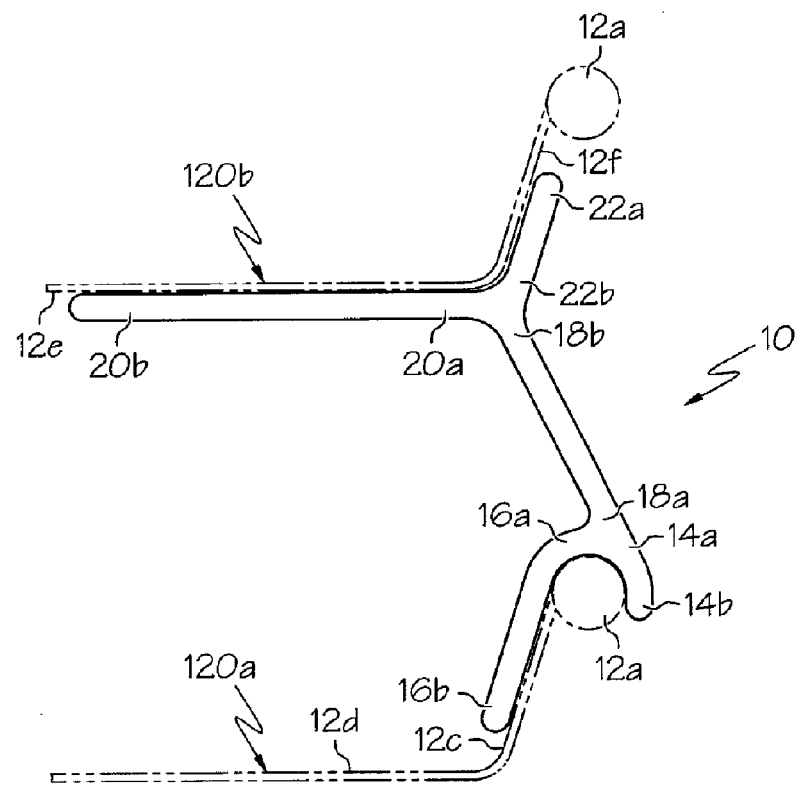
FIG. 2 shows a side elevational view of the invention engaging upper and lower baking pans that are depicted in phantom view.

FIGS. 1 and 2 illustrate a unitary, single-piece baking pan support clip 10, for stacking a plurality of baking pans 12 without contacting or damaging the baked goods of each pan 12. The clip 10 permits the stacking and unstacking of containers including, but not limited to, baking pans, trays, and shelves to conserve space in a kitchen, greenhouse, or in any other area in which containers capable of being stacked are used. The clip 10 comprises an outer base leg member 14, an inner base leg 16, a flat vertical shaft 18, a horizontal arm 20, and an upper vertical arm 22. The clip 10 preferably is used to support stackable baking pans 12, bread pans 12, cookie trays, and pizza pans that have a pronounced cylindrical lip bead 12a surrounding the upper edge of a sidewall 12b of said baking pan 12. Baking pans, bread pans and pizza pans come in standard sizes including bead sizes. Most baking and bread pans are rectangular while pizza pans are round.

Several clips 10 are attached to the lip bead 12a of a lower pan 120a to support an upper pan 120b that is stacked and rested upon the horizontal arms of the support clips 10.

Each clip 10 is manufactured by molding, preferably of aluminum, but may also be formed, shaped, or stamped into a similar configuration using one or more pieces of metal or another suitable material. The clip body vertical shaft 18 is flat and comprises a thin, planar bar having a first end area 18a and a second end area 18b. The vertical shaft 18 is oriented at substantially the same angle as the outer arm 14, and, in the preferred embodiment of the invention, the vertical shaft 18 and outer arm 14 form one colinear segment. The base inner leg 16 and the base outer leg 14 are integrally molded to the first end area 18a of the vertical shaft 18. The horizontal arm 20 and vertical arm 22 form an obtuse angle at the second end area 18b of said vertical shaft 18.

The base outer leg 14 comprises a thin, planar bar having an area 14a solidly attached to the vertical shaft 14 and to the base inner leg 16 and a free end 14b that form a cylindrical recess 14a for engaging the lip bead 12a of the lower pan 120a. The base outer leg 14 and base inner leg 16 adjoin solidly with the vertical shaft 18 to form a cylindrical recess 24 between said base outer and inner legs 14 and 16. Preferably, the base outer leg 14 diverges from the recess 24 at an angle sloping away from the direction of the slope of the base inner leg 16 and extends downwardly no further than a point that is horizontally parallel with the lowest edge of the lip bead 12a of said pan 12. The free end 14b of the base outer leg 14 is curved slightly toward the base inner leg 16 so as to provide a more secure and snug geometric fit with the cylindrical shape of the lip bead 12a of the pan 12. The beaded lip can snap on to the clip recess by being slightly larger in diameter than the clip recess. The base legs 14 and 16 can be flexible to snap over the pan bead 12a. The base area 16a of the base inner leg 16 is slightly curved proximal to the point of connection of said base inner leg 16 with the vertical shaft 18 and base outer leg 14. Preferably, the base inner leg 16 is longer than the base outer leg 14 for leverage and support.

The configuration of the base legs 14a and 16a is curved to form the base recess 24 between said base inner and outer legs 14 and 16. The base recess 24 is shaped as a cylindrical channel running between the base inner leg 16 and base outer leg 14, and is complementary in shape to a cylindrical lip bead 12a of the baking pan 12. The base recess 24 of the clip 10 is slipped or snapped over the lip bead 12a of the lower pan 120a.

Once three or more clips are vertically attached to a lower pan, the upper pan is placed on the clip horizontal arms for stackable support. The weight of the upper container 120b resting upon the clip 10 also forces the base inner leg 16 of each clip 10 against the interior sidewall 12c of the lower pan 120a to hold the clip 10 firmly into place on the lip bead 12a of said lower pan 120a.

In the preferred embodiment, the horizontal arm 20 is disposed at an obtuse angle relative to vertical arm 22.

Each clip has the identical configuration for a specific sized baking pan, bread pan, cookie sheet or pizza pans. A set of clips 3, 4 or 6 can be of a predetermined length for specific functions. The overall clip configuration is the same for all uses except the base recess may vary slightly for different type baking pans that have different bead sizes and shapes. The horizontal arm and vertical arm lengths and angular disposition relative to the vertical shaft and thickness are selected to balance each clip as a support, thus considering the center of gravity of each clip.

Each clip 10 is constructed from any sturdy, rigid material, including, but not limited to, metals, metal alloys, plastics, elastomer-coated metal or metallic alloys, and other polymers. For use in cooking applications and in other instances where needed, the clip 10 is constructed preferably from a heat-resistant material such as aluminum. The clip 10 may also be constructed from cold-resistant materials when used in refrigerated or freezing applications. Said clips may be manufactured in any size needed, but preferably, are manufactured to fit various standard baking pans of standard sizes. Although, in the preferred embodiment, the four arms and legs, 14, 16, 20 and 22, and the vertical shaft 18 are comprised of a thin, planar bar of material, the inventor recognizes that any other suitable shapes, such as cylindrical fingers or bifurcated bars, may be used for the design of said leg members and said vertical shaft. In one embodiment of the invention, a top planar surface 20c of the horizontal arm member 20 may include a plurality of sliding beads (not shown in the drawings) to facilitate the sliding removal of the upper container 120b.

Figure 3:
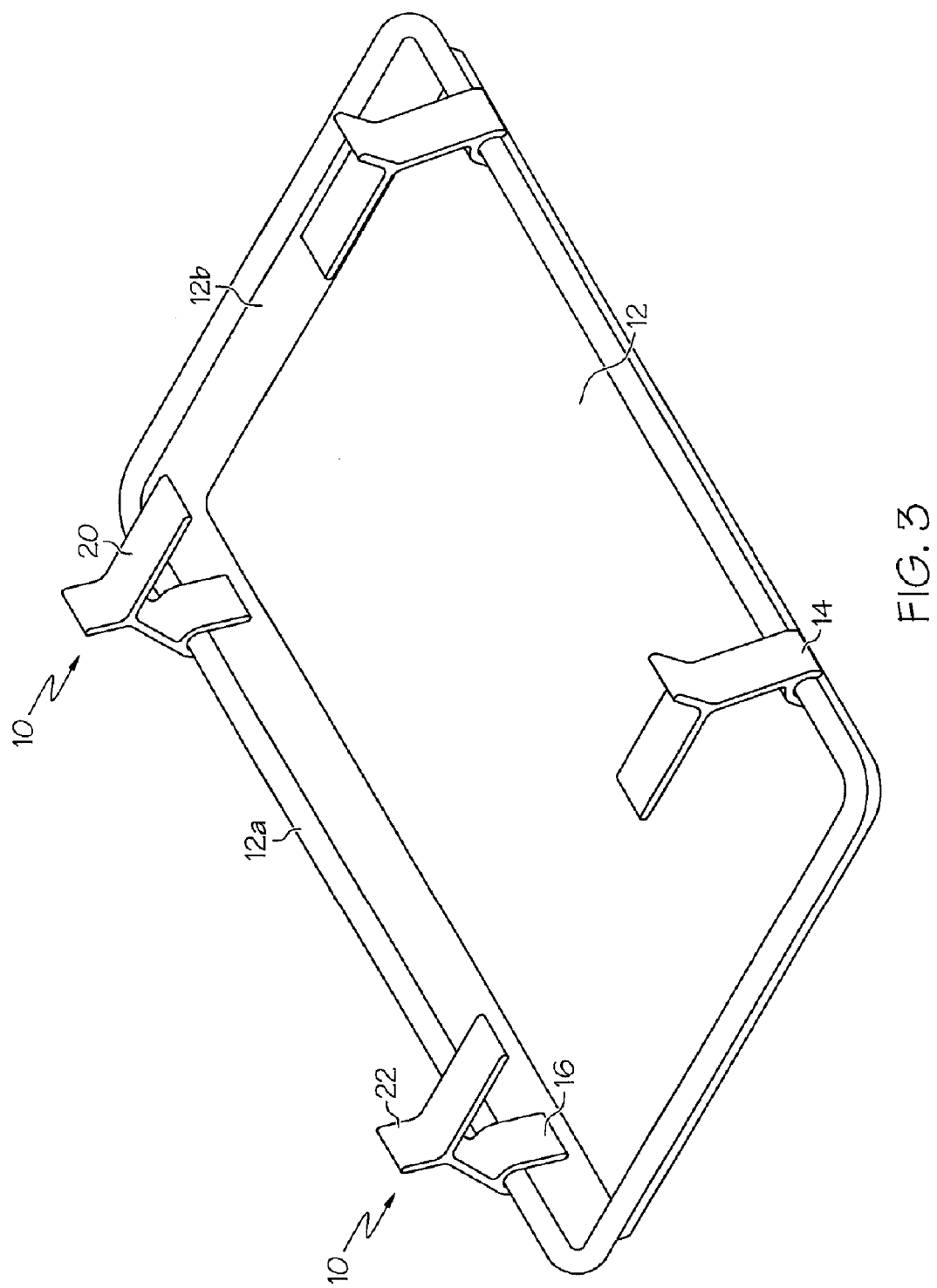
FIG. 3 shows a perspective view of four clips connected to the lip bead of a lower baking pan, two to each side of said baking pan.

A plurality of clips 10 is shown in use in FIG. 3 supporting an upper baking pan 120b or cookie tray that is to be stacked upon a lower pan 120a or tray. Preferably four or more of said clips 10 must be attached to the lower pan 120a or tray to accommodate and adequately support the upper pan 120b or tray that is stacked above said lower pan or tray. Preferably, two clips 10 are attached, one to each end of two opposing sides of the lower pan 120a or tray with the individual units of each pair of clips 10 spaced at a sufficient interval to adequately support the upper pan 120b or tray that is to be stacked above said lower pan 120a or tray. Attachment of the clips 10 to the pan 12 in the configuration illustrated in FIG. 3 provides excellent stability to ensure that a stacked upper pan does not slip or fall from the lower pan to which said clips 10 are attached. Baking pans can be stacked in a vertical array using four support clips on the lower supporting pan in each tier. Hot baking pans fresh out of the oven can be stacked on countertops, stovetops or in cabinets with several tiers of pans for saving space in a busy restaurant or bakery. Pans can be stacked in ovens such as pizza pans or cookie sheets. Trays and pans can also be stacked in refrigerators. Ease of use and storage space saving at an extremely reasonable price.

Figure 4:
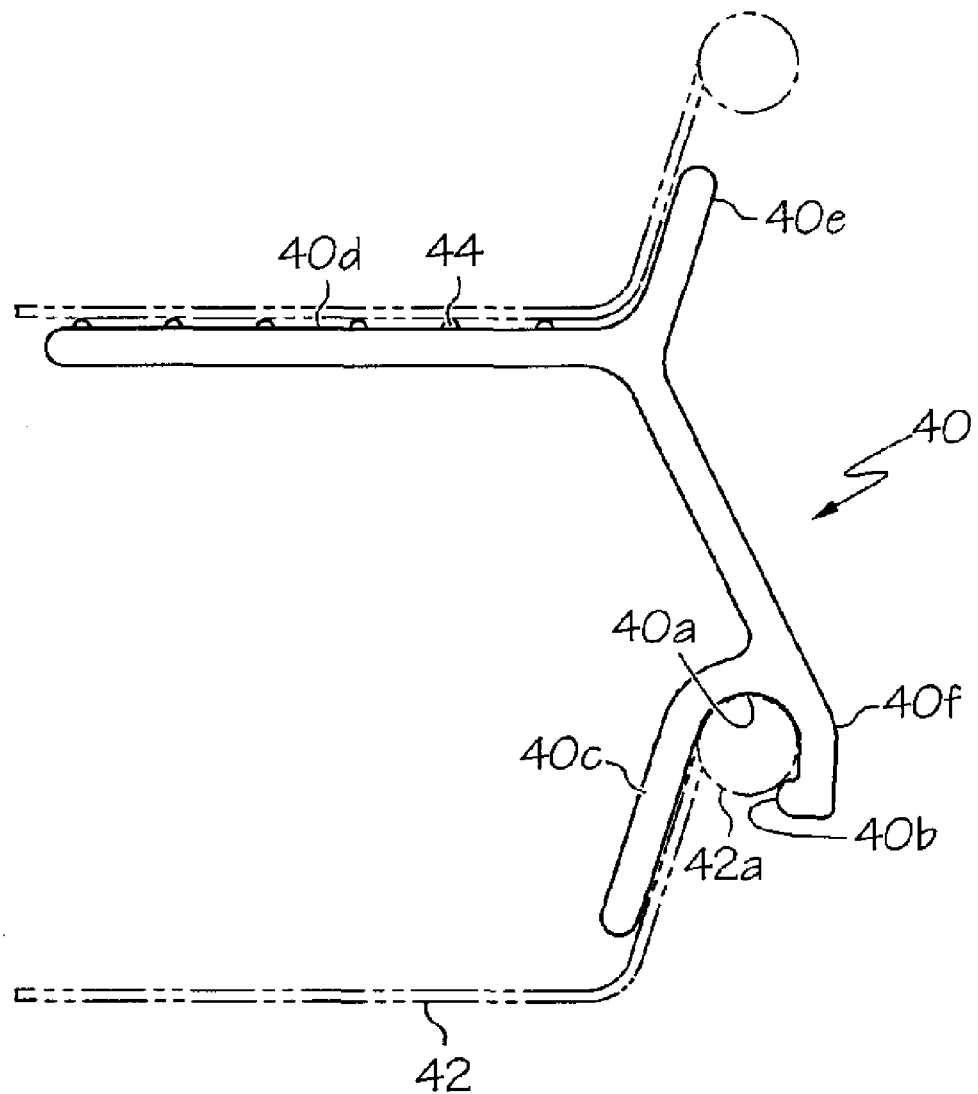
FIG. 4 shows a side elevational view of another clip that is an alternate embodiment of the invention.

Referring now to the drawings and, in particular, FIG. 4, an alternate embodiment of the clip 40 provides a snap bead 40b at the edge of the recess 40a that allows the snap bead and the recess that includes leg 40c to be snapped on the bead of a pan 42 to lock it firmly in place. The clip legs 40c and 40f are sufficiently resilient to expand slightly to permit the bead 42a which is larger in diameter than the distance between the snap bead 40b and the leg 40c to snap into place to firmly hold clip 40 in place on a baking pan 42.

Also shown on horizontal arm 40d of clip 40 are a pair of slide beads that facilitate sliding of the upper pan so that it snuggly fits when four or more clips are placed on the lower pan guiding the upper pan into position in conjunction with the vertical arm 40e.

Figure 5:
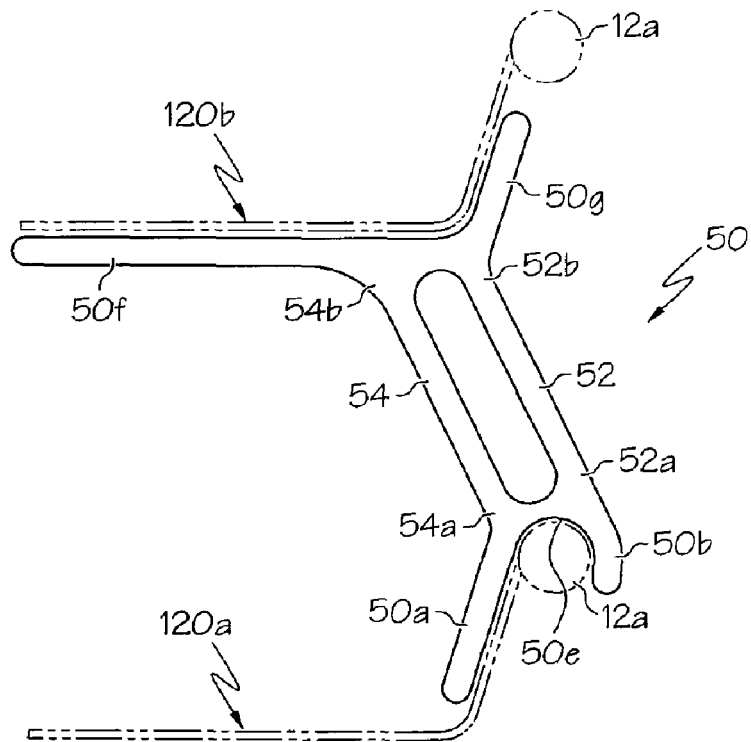
FIGS. 5 through 8 show side elevational views of three alternate embodiments of the invention engaging upper and lower baking pans that are depicted in phantom view.

FIGS. 5 through 9 illustrate several alternate embodiments of the clip 10. FIG. 5 illustrates a clip 50 having a first vertical shaft and a second vertical shaft, 52 and 54 respectively, disposed parallel in relation to one another. A first end area 52a of first vertical shaft 52 is connected solidly to a base inner leg 50a and a base outer leg 50b of the clip 50. A first end area 54a of the second vertical shaft 54 is connected solidly to the base inner leg 50a of the clip 50 just above the cylindrical recess 50e formed where base inner leg 50a and base outer leg 50b join. A horizontal arm 50f and a vertical arm 50g form an obtuse angle at a second end area 52b of said first vertical shaft 52. A second end area 54b of the second vertical shaft 54 connects solidly to the horizontal arm 50f at a point proximal to the obtuse angle formed where said horizontal arm 50f and the vertical arm 50g are adjoined.

Figure 6:
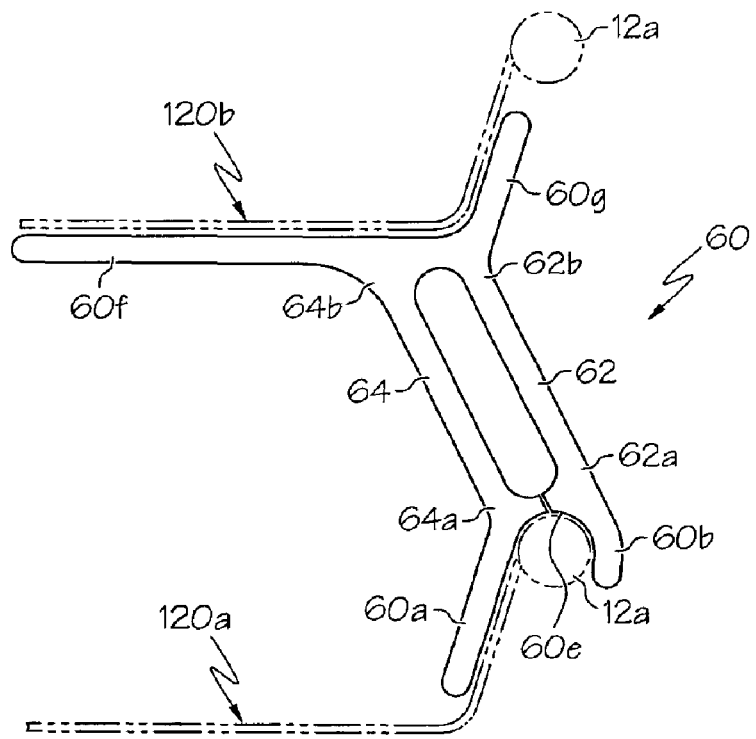

FIG. 6 illustrates a clip 60 having a first vertical shaft and a second vertical shaft, 62 and 64 respectively, disposed parallel in relation to one another and a bifurcated base inner leg 60a and base outer leg 60b. The bifurcated inner and outer legs 60a and 60b are not solidly connected, but rather, are cut after extrusion of the clip metal to provide said clip 60 with a spring lock fit with the cylindrical lip bead 12a of a baking pan 12. The bifurcation is cut through that part of the clip 60 that forms a cylindrical recess 60e where said base inner leg 60a and said base outer leg 60b are adjoined. In this manner, the base inner leg 60a and base outer leg 60b can be moved apart in a spring action to accommodate lip beads 12a of various sizes. A first end area 62a of first vertical shaft 62 is connected solidly to the base outer leg 60b of the clip 60. A first end area 64a of the second vertical shaft 64 is connected solidly to the base inner leg 60a of the clip 60 just above the cylindrical recess 60e. In this manner, the base inner leg 60a, which is solidly connected to the second vertical shaft 64, and the base outer leg 60b, which is solidly connected to the first vertical shaft 62, can be moved apart in a spring action to accommodate lip beads 12a of various sizes, and particularly of sizes larger than the standard baking pan lip bead 12a. A horizontal arm 60f and a vertical arm 60g form an obtuse angle at a second end area 62b of said first vertical shaft 62. A second end area 64b of the second vertical shaft 64 connects solidly to the horizontal arm 60f at a point proximal to the obtuse angle formed where said horizontal arm 60f and the vertical arm 60g are adjoined.

Figure 7:
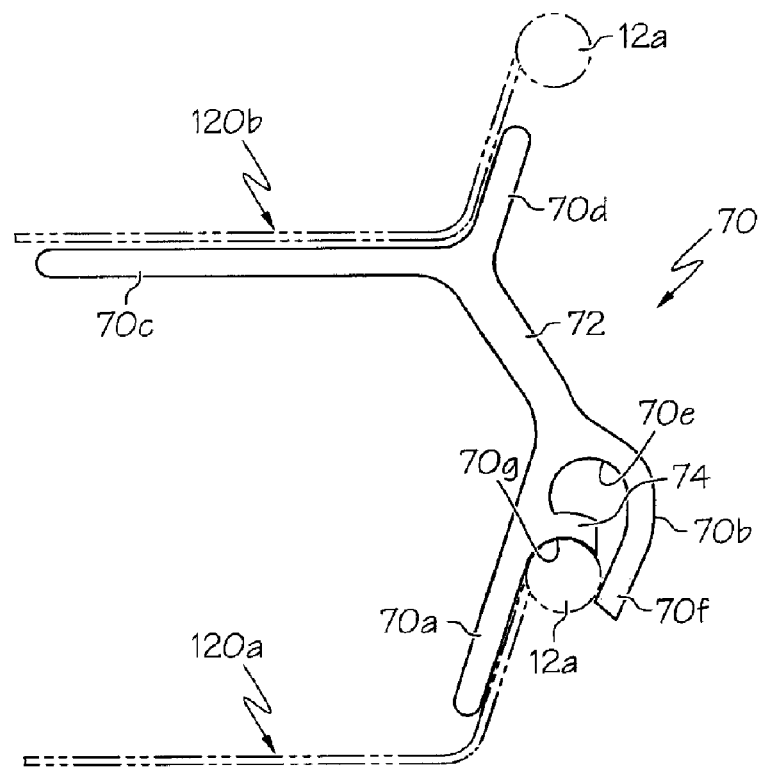

FIG. 7 illustrates a clip 70 the same as clip 10 in FIGS. 1 and 2, with the exceptions that said clip 70 includes a longer base inner leg 70a and a longer base outer leg 70b, which are adjoined solidly together with a vertical shaft 72 to form a first cylindrical recess 70e. The outer leg 70b of clip 70 diverges away from the axis of the vertical shaft 72 at an angle rather than being colinear with the axis of the vertical shaft 18 of clip 10. An end portion 70f of the base outer leg 70b is longer and oriented at an angle nearer to the base inner leg 70a than with the embodiment of the invention shown in FIG. 2. The base inner leg 70a includes an arcuate projection 74 that is angled toward the base outer leg 70b to form a second cylindrical recess 70g for receiving the cylindrical lip bead 12a. Said arcuate projection 74 comes near but does not contact the base outer leg 70b. The greater length of the base outer leg 70b in this embodiment provides the clip 70 with a more pronounced spring action for flexing and then returning to the original shape, thereby securely capturing and holding the cylindrical lip bead 12a. A horizontal arm 70c and a vertical arm 70d of the clip 70 are identical in shape and configuration with relation to the vertical shaft 72 to the horizontal and vertical arms 20 and 22 shown for clip 10 in FIG. 1.

Figure 8:
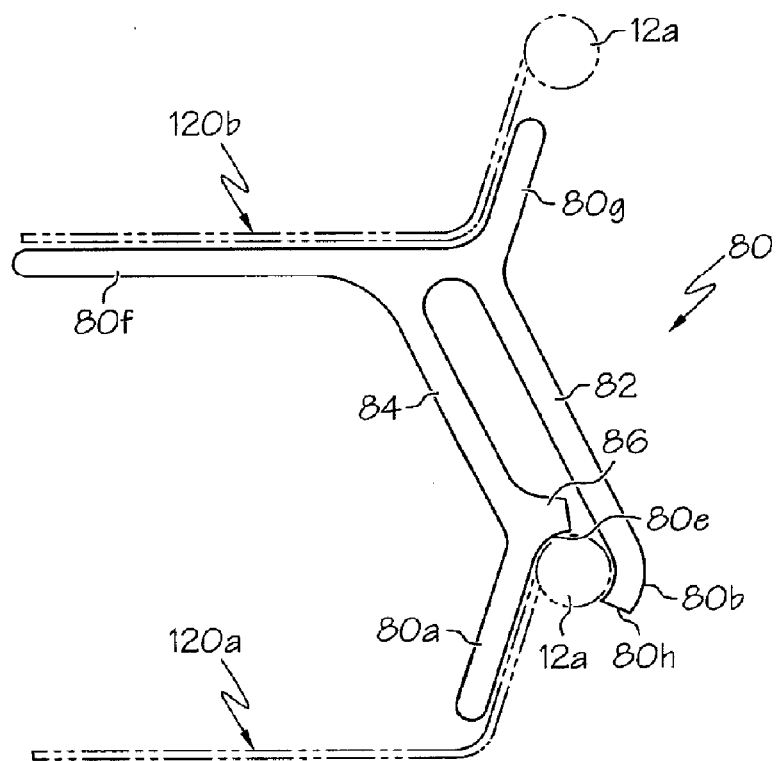

FIG. 8 illustrates a clip 80 similar to the clip 60 shown in FIG. 6. The clip 80 has a first vertical shaft and a second vertical shaft, 82 and 84 respectively, disposed parallel in relation to one another and a bifurcated base inner leg 80a and base outer leg 80b. In this embodiment, however, the bifurcated inner and outer legs 80a and 80b are not solidly connected, but rather, are cut above a cylindrical recess 80e and close to the base outer leg 80b after extrusion of the clip metal. The bifurcation of the inner and outer legs 80a and 80b results in a pronounced projection 86 that extends from said base inner leg 80a toward said base outer leg 80b. This bifurcated structure and the projection 86 provide said clip 80 with a spring-like snap action fit with the cylindrical lip bead 12a of a baking pan 12. The bifurcation is cut through that part of the clip 80 that forms the cylindrical recess 80e where said base inner leg 80a and said base outer leg 80b are adjoined. An end portion 80h of the base outer leg 80b is oriented at an angle more toward the base inner leg 80a than the embodiment of the invention shown in FIG. 6. The angling of the end portion 80h toward said base inner leg 80a provides the spring-like snap action used to accommodate and secure the clip 80 to baking pan lip beads 12a of various sizes. A horizontal arm 80f and a vertical arm 80g of the clip 80 are identical in shape and configuration with relation to the vertical shafts 82 and 84 to the horizontal and vertical arms 60f and 60g shown for clip 60 in FIG. 6.

Figure 9:
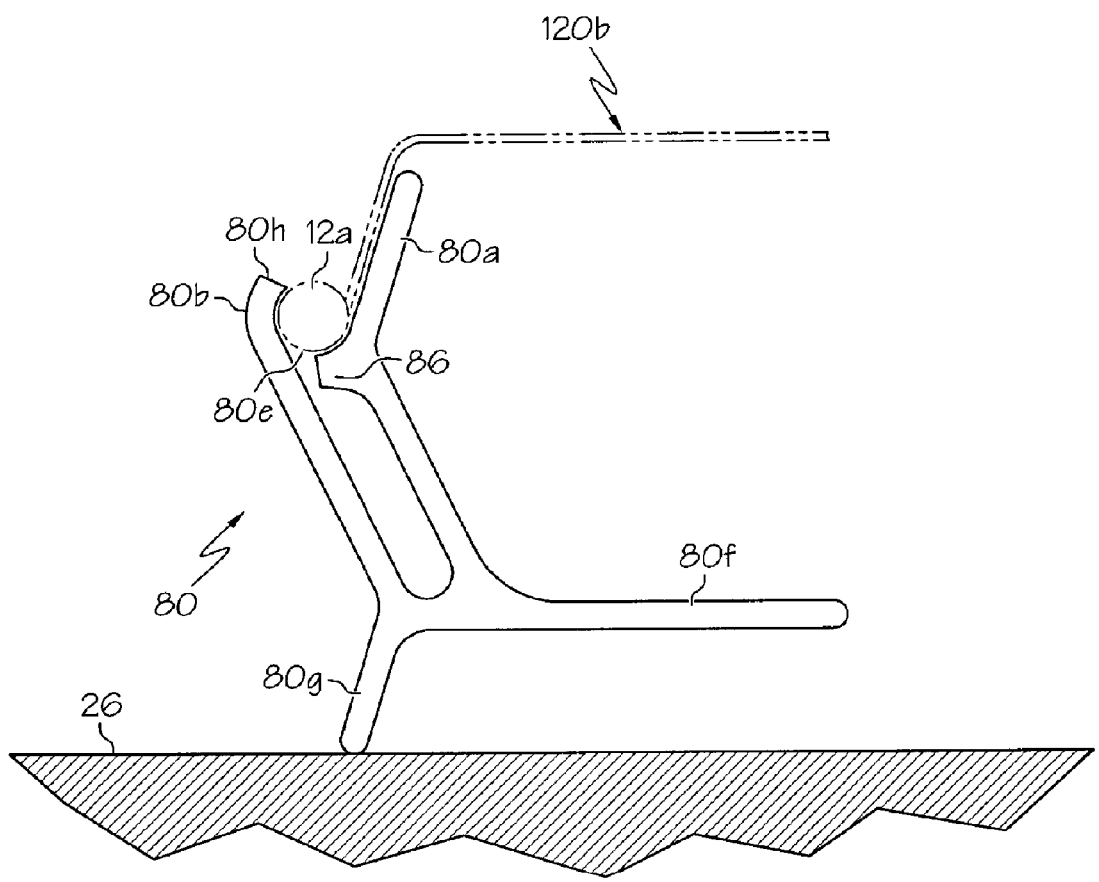
FIG. 9 shows a side elevational view of the alternate embodiment of the device as shown in FIG. 8 in an inverted position engaging an inverted baking pan, said baking pan being shown in phantom view.

FIG. 9 illustrates clip 80 inverted so that the vertical arm 80g rests upon a table or countertop surface 26. By inverting the clip 80 in this way, the baking pan 120b can also be inverted and the lip bead 12a of said pan 120b securely snapped into the cylindrical recess 80e formed by the base inner leg 80a, base outer leg 80b, and the projection 86. The inverted baking pan 120b is elevated above the table surface 26 in this configuration with a bottom surface 12e of said pan being oriented upward to provide a flat surface upon which food items or other objects can be placed.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A unitary, single-piece baking pan support clip for stacking an array of baking pans without contacting or damaging the baked goods of each pan, comprising:
    a unitary body having: at least one thin flat rigid shaft having a first end and a second end;
    a base member including an outer base leg and inner base leg forming a base concave area recess attached at said second end of the shaft for engaging a lip bead of a lower pan, said base member being a rigid thin J-shaped bar;
    said unitary body having an upper L-shaped arm;
    said upper L-shaped arm connected integrally to first end of the thin flat rigid shaft for contacting and supporting an exterior bottom surface of an upper pan, said upper arm having L-shaped arm members forming an L-shaped oblique angle and said J-shaped base connected to said second end of said thin flat rigid shaft on a convex area of the J-shaped base; and
    said L-shaped arm attached to said first end of said thin flat rigid shaft at the back side of the intersection of the L-shaped arm members forming the L-shape.

2. The baking pan support clip of claim 1, wherein the base the upper L-shaped arm and the shaft are integrally molded together and comprised each of a thin, planar bar of rigid material.

3. The baking pan support clip of claim 1, wherein three or more of said clips must be attached to the lower pan or tray to accommodate and adequately support an upper pan or tray that is stacked above said lower pan or tray.

4. The baking pan support clip of claim 1, wherein the base member inner leg is longer than said outer leg and the configuration is to provide a balanced center of gravity for each clip in use.

5. The baking pan support clip of claim 1, wherein said arm, when under the weight of the stacked upper baking pan being a counterweight that pivots the J-shaped base toward the interior sidewall of the lower baking pan to engage onto the side of the baking pan.

6. The baking pan support clip of claim 1, wherein multiple pans can be stacked in a vertical array one on top of another using a plurality of clips without contacting or damaging the baked goods of each pan container among the tier of baking pans.

7. The baking pan support clip of claim 1, wherein the clip is inverted to engage the baking pan, which is also inverted, so that the cylindrical lip bead of said inverted baking pan is seated within and engaged by the J-shaped recess of said clip.

8. The baking pan support clip of claim 1, wherein the clip is manufactured by molding of aluminum.

* * * * *